(12) United States Patent
Zaffaroni

(10) Patent No.: US 11,186,450 B2
(45) Date of Patent: Nov. 30, 2021

(54) APPARATUS FOR HANDLING METAL SHEETS AND OPERATION METHOD THEREOF

(71) Applicant: ASTES4 SA, Balerna (CH)

(72) Inventor: Roberto Zaffaroni, Balerna (CH)

(73) Assignee: ASTES4 SA, Balerna (CH)

( * ) Notice: Subject to any disclaimer, the term of this patent is extended or adjusted under 35 U.S.C. 154(b) by 118 days.

(21) Appl. No.: 16/593,345

(22) Filed: Oct. 4, 2019

(65) Prior Publication Data

US 2020/0109016 A1 Apr. 9, 2020

(30) Foreign Application Priority Data

Oct. 4, 2018 (IT) .......................... 102018000009172

(51) Int. Cl.
*B65G 47/90* (2006.01)
*B65G 47/92* (2006.01)

(52) U.S. Cl.
CPC ............. *B65G 47/92* (2013.01); *B65G 47/90* (2013.01)

(58) Field of Classification Search
None
See application file for complete search history.

(56) References Cited

U.S. PATENT DOCUMENTS 4,480,824 A * 11/1984 Acquaviva ......... G03B 27/6257
250/223 R
2008/0173831 A1* 7/2008 Wuestefeld .............. G01V 8/20
250/551

FOREIGN PATENT DOCUMENTS

EP       1 222 975         7/2002
WO    WO 2008/139409    11/2008

OTHER PUBLICATIONS

Italian Search Report, IT 201800009172, dated May 28, 2019.

* cited by examiner

*Primary Examiner* — Ronald P Jarrett
(74) *Attorney, Agent, or Firm* — Nixon & Vanderhye

(57) ABSTRACT

An apparatus for handling sheets and the operating method thereof is disclosed, the apparatus including: a handling unit for gripping and transferring sheets to and from a sheet change support with a substantially horizontal attitude; and a receiving-transmitting electromagnetic beam unit which generate electromagnetic beams arranged on a plane which is intercepted by the sheets when they take up an attitude at least partially different from the horizontal one. The receiving-transmitting electromagnetic beam unit is fixedly arranged on at least a couple of linear bars arranged at the same height for generating a horizontal-mesh barrier, consisting of intersecting, stationary electromagnetic beams, generated by the receiving-transmitting unit, the barrier being defined above an area occupied by the sheet change support.

16 Claims, 4 Drawing Sheets

APPARATUS FOR HANDLING METAL SHEETS AND OPERATION METHOD THEREOF

FIELD OF THE INVENTION

The present invention relates to an improved apparatus for the handling of metal sheets, in particular to such an apparatus cooperating with metal sheet cutting centres/stations, as well as an operation method thereof.

BACKGROUND

As known, in metal sheet processing and handling the need exists to transfer and handle the metal sheets between one workstation and the other. In particular, the metal sheets are taken from stored stacks and then transferred to the desired locations by means of handling arms of various kinds.

A particularly effective handling system is the one described in WO2008/139409 in the same Applicant's name, which is here recomprised as reference.

Since metal sheets are usually rather thin (for example from 0.5 to 25 mm), but long (for example 1500×3000 mm) and rather heavy, the need exists to guarantee that they are correctly retained in the desired attitude (typically horizontally) by the handling arms, without a metal sheet portion deviating from the provided attitude and hence ending up colliding against equipment during transfer.

A particularly critical condition, from this point of view, occurs in handling apparatuses for cutting stations (precisely the one described in WO2008/139409). As a matter of fact, in cutting stations sheets are cut into a plurality of shaped pieces, sometimes with a highly complex perimeter. The cut is performed with various techniques, also based on the composition of the sheet material: for example, there are machines employing laser cutting, oxygen lance cutting, water jet cutting, plasma cutting and so on. Once the cut has been completed, the handling system must, on the one hand, take the individual cut-to-measure, shaped pieces and convey them to a dedicated storage place or to the further processing and assembling stations and, on the other hand, it must collect the scraps—that is the residual sheet waste, which is left over after the removal of the individual cut pieces—and transfer them to a collection point thereof.

Under these circumstances the most significant drawbacks arise, because the shaped pieces, cut to measure, might remain partly joined to the remaining scrap material, for example due to an insufficiently deep cut or to a geometric constraint. When laser cutting heads are employed, undesired joining points of the pieces to an underlying supporting mesh may also arise, which would cause similar drawbacks.

So, upon capture of the shaped pieces by the handler and upon lifting, jamming may arise in the handling cycle. From FIG. 1 herewith enclosed, which represents a detailed perspective view of a handler lifting a piece cut-in from a metal sheet, a possible anomaly can be noticed due to residual joining (identified in the right-hand circle) between a cut piece and the metal sheet scrap thereof.

If the working cycle of cut piece grabbing and drawing is continued under these conditions, it can be generated a undesired dragging and lifting also of the part of the metal sheet not belonging to the cut piece, causing interference or malfunctioning problems, with likely fault detection, operating cycle halt and need for essential intervention by an operator.

In order to avoid these drawbacks, according to the prior art it has already been suggested to use optical detection systems, which generate "manual action warning" signals when they detect an irregular attitude of the shaped pieces or of the metal sheet scraps.

Typically, since the lifting always occurs with the metal sheet kept on a horizontal plane, it is provided to install a horizontal light beam, generated by a horizontally sweeping light source mounted in rotation on a support, so as to sweep the work area of the handling apparatus.

Since the metal sheet is very thin, if it remains on the horizontal plane it has no effect on the rotating light beam. If part of the metal sheet—due to some malfunctioning in the picking up step—tilts with respect to the horizontal plane, it is struck by the light beam, which is reflected by the metal surface and detected by suitable optical sensors. When the optical detection system determines a situation of reflection of the optical beam, it generates a warning signal which acts on the control logic of the machine cycle, so as to promptly act before faults are generated in the handling apparatus.

However, known-art optical detection systems did not prove fully reliable. In particular, when the metal sheet is very thin, conditions may arise wherein the light beam is not reflected even though metal sheet components irregularly dangle off the drawing plane.

The prior art offers other types of detection light beams, not necessarily rotary ones. For example, EP1222975 discloses a position detection system of a workpiece to be processed, wherein a plurality of light beams converging towards a limited working area are provided, configured so as to detect the accurate position of the piece to be processed. However, this configuration is apt to be applied on a limited working area, where it is important to determine the exact position of a piece to be processed, but it would be costly if employed on the entire area of a sheet (of the size of a few square meters) in a cutting station.

SUMMARY OF THE INVENTION

The problem underlying the invention is therefore to offer an apparatus which provides a simple and economic solution to the problem of detecting anomalies in the operating steps of picking-up and transferring the metal sheets onboard the handling devices; in particular, it is required to provide a detecting apparatus which has a better and more reliable operation with respect to the prior-art solutions.

This solution is obtained through an apparatus and a method having the features mentioned in the main claims herewith enclosed. The dependent claims disclose preferred features of the invention.

BRIEF DESCRIPTION OF THE DRAWINGS

Further features and advantages of the invention, however, will be more evident from the following detailed description of a preferred embodiment, given purely as a non-limiting example and illustrated in the attached drawings, wherein.

DETAILED DESCRIPTION OF THE PREFERRED EMBODIMENT

Figure 1:
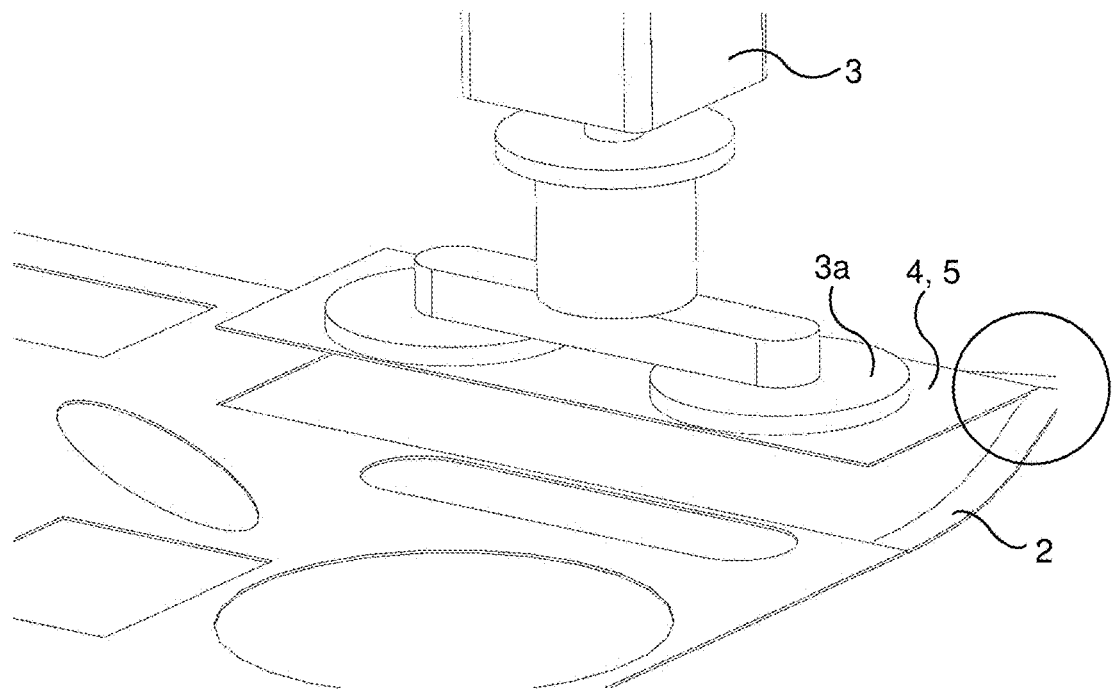
FIG. 1, as already anticipated, relates to an enlarged perspective view of a handler detail during the lifting of an exemplifying cut-in metal sheet.

As evident from the schematic view of FIG. 1, a metal sheet cutting station typically comprises a resting bed or sheet change support 1 in the proximity of a cabinet 1a which encloses the cutting equipment (for example a laser beam head, with movable frame thereof and control logic).

Sheet change support 1 typically comprises a resting mesh, for example consisting of parallel strips, whereon a metal sheet to be cut 2 is meant to be laid, which is then cut in according to a programme preset in the control logic of the cutting station. For such purpose, sheet change support 1 moves within cabinet 1a or remains stationary and a cutting head is moved with respect to it.

Handling metal sheet 2 to and from sheet change support 1, both when it is complete and when it is divided into the various shaped pieces and into the scraps, is accomplished through a suitable handling apparatus. Such apparatus uses transfer handlers, known per se, for example gripping heads 3 provided for example with suction or magnetic picking-up units 3a.

In this known arrangement, in a first step, gripping heads 3 grip every time a metal sheet 2 from a stack of metal sheets and transfer it—keeping it on a horizontal plane—to the resting mesh of the change support 1 of the cutting station. Once metal sheet 2 is thus positioned, the cutting means (not shown) are made to operate to perform the cutting of the metal sheet so as to define a series of shaped pieces 4, 5—cut to measure according to even very different profiles—meant to be severed from the remaining parts of the metal sheet, making up scrap parts. In a further step, gripping heads 3 act again to pick-up shaped pieces 4, 5 and to transfer them to a storage location or to subsequent processing. Finally, the same gripping heads or other similar means (for example, multiple-prong forks joined to the gripping heads, as illustrated in FIG. 5) act to remove also the scrap parts of metal sheet 2, to be sent to a disposal cycle.

Figure 2:
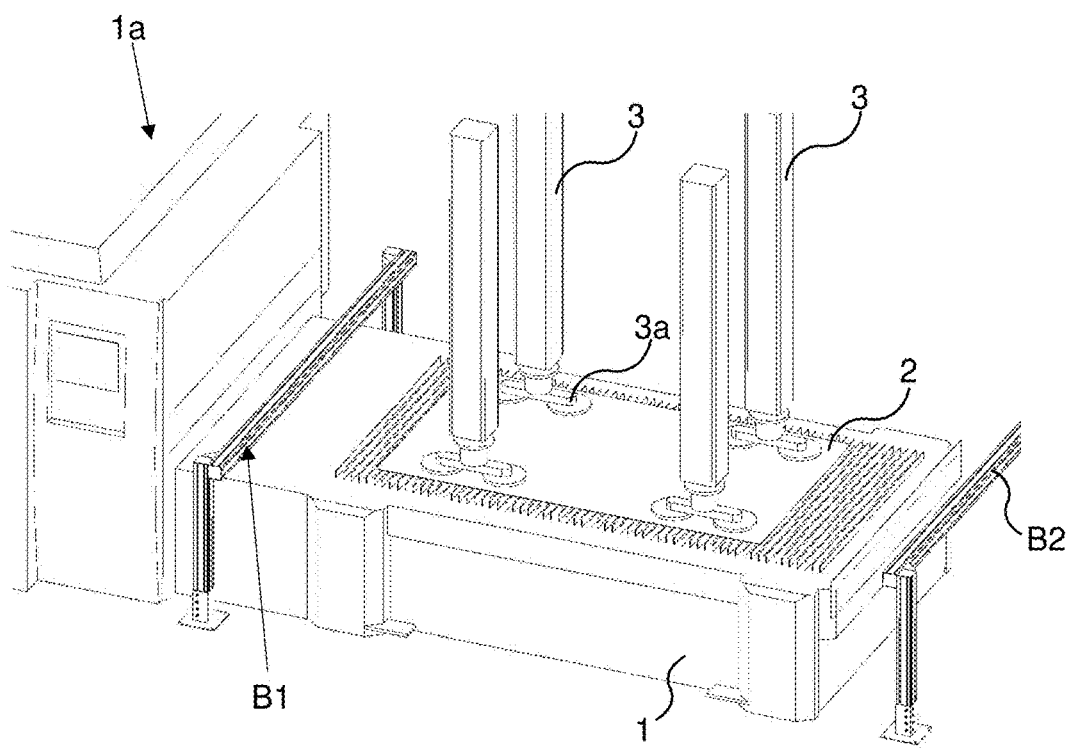
FIG. 2 is a perspective overall view of the apparatus of the invention mounted in the proximity of a cutting station.
Figure 3:
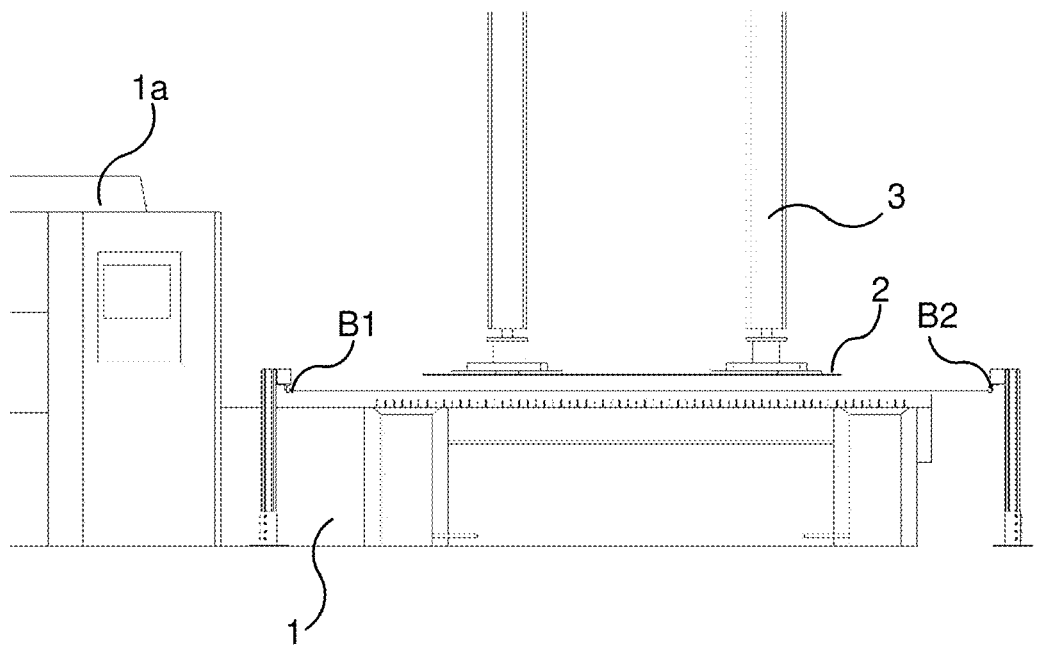
FIG. 3 is a schematic elevation side view of the apparatus of FIG. 2.
Figure 4:
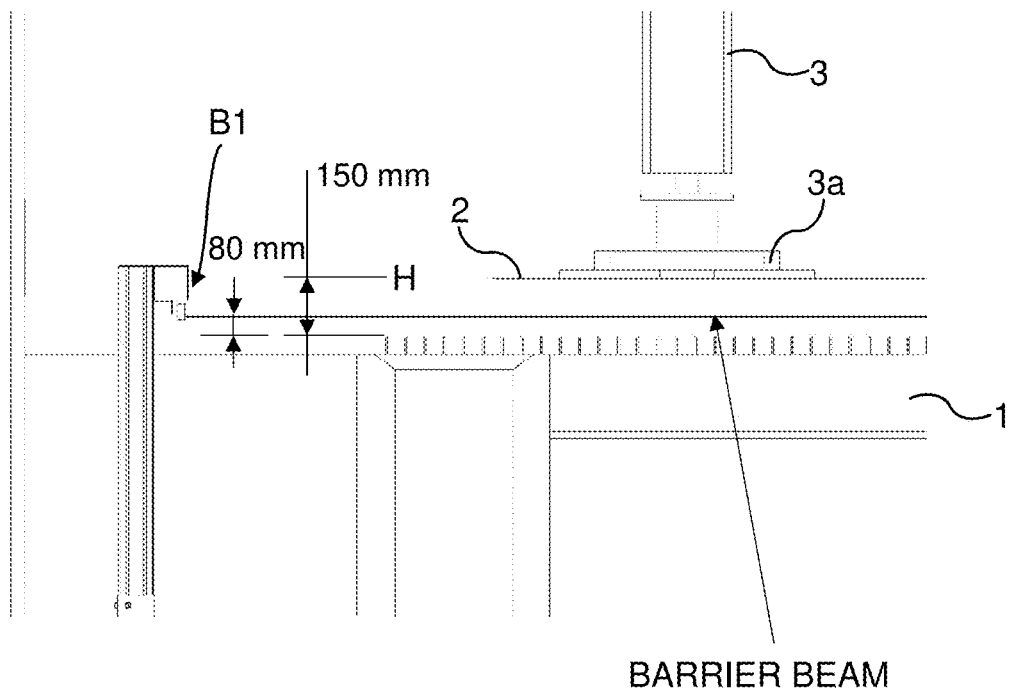
FIG. 4 is a schematic elevation side view of an enlarged part of the apparatus of FIG. 3.
Figure 5:
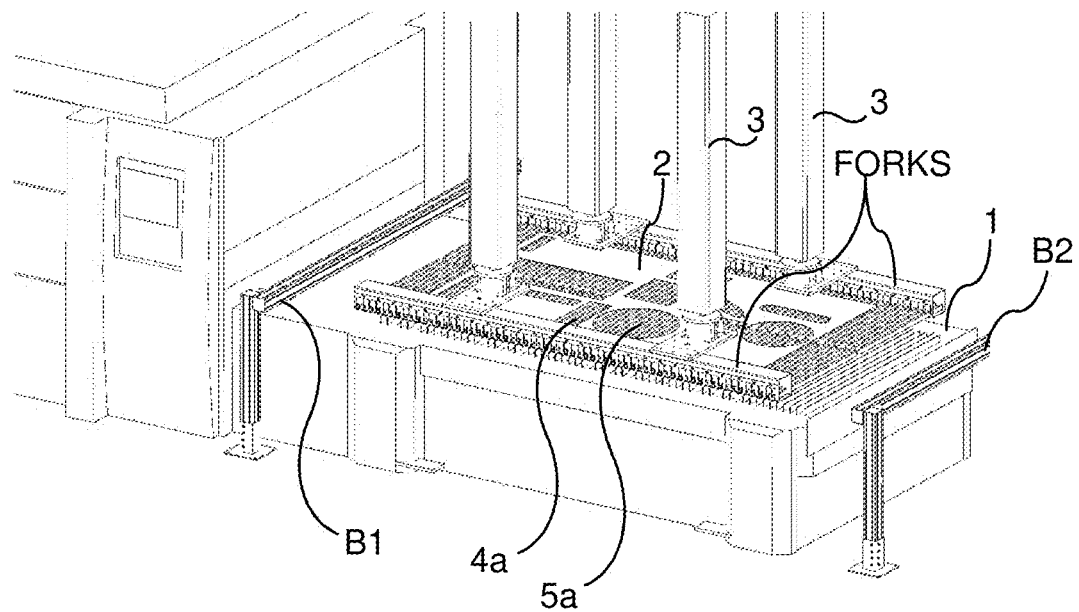
FIG. 5 is a similar view to that of FIG. 2 with scrap removing forks.

Exemplifying, in FIGS. 2 and 5 the handling apparatus is shown in the step wherein, after the removal of shaped pieces 4, 5 (in FIGS. 2 and 5 only the areas 4a and 5a of metal sheet 2 are shown, from which said pieces 4, 5 have already been removed), gripping heads 3 are returned onto the residual structure (scrap) of metal sheet 2, to draw it—in FIG. 2 with suction devices, while in FIG. 5 with forks—and to transfer it to the disposal cycle.

Figure 6:
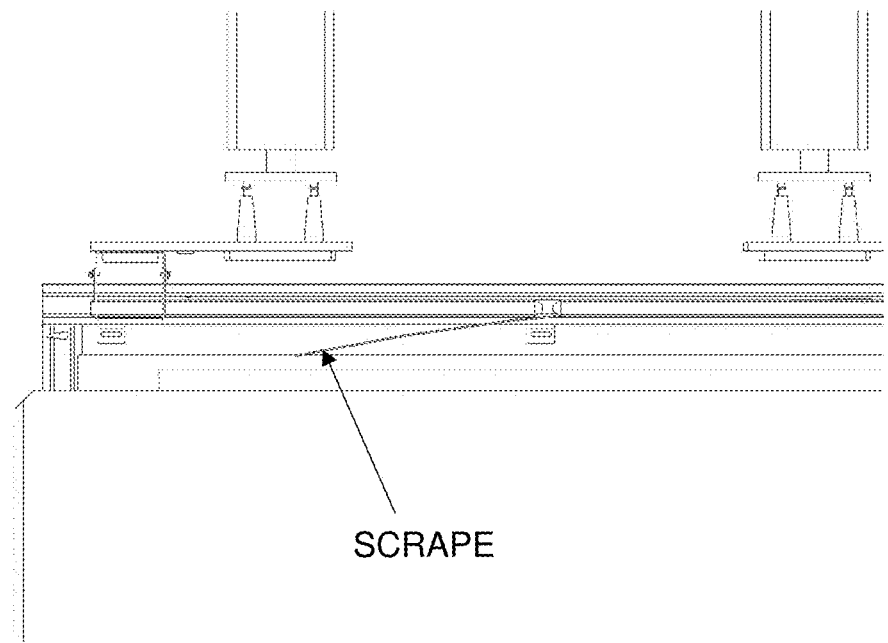
FIG. 6 is an elevation front view of the apparatus of FIG. 5.

As already mentioned above, both during the removal step of individual shaped pieces 4 or 5 (FIG. 1), and during scrap removal (FIGS. 2 and 5), conditions may occur in which the metal sheet does not remain perfectly horizontal—as provided by the control logic in movement programming—but some parts thereof may tend to remain fastened to other components or in any case to dangle irregularly downwards (see also FIG. 6, wherein a thin portion of scrap runs through the fork prongs and dangles downwards). These metal sheet gripping irregularities, as is self-explanatory, will cause drawbacks in the operation of the handling apparatus and problems in the subsequent removal operation and, more likely, they will end up causing unpleasant jams up to cycle halt.

In order to promptly detect such irregularities and possibly act automatically, according to the invention a detection system is provided consisting of a horizontal barrier employing stationary intersecting electromagnetic beams with relative detectors.

In particular, according to the invention, the horizontal barrier is defined by at least one pair of bars of receiving-transmitting photodiodes B1 and B2, arranged facing each other on two opposite sides of sheet change support 1 where the pieces and scrap of the sheet are lying after cutting.

The two horizontal bars of photodiodes B1 and B2—and hence the horizontal barrier of electromagnetic beams—are arranged at the same height, just above the resting plane of metal sheets 2 on sheet change support 1 of the handling apparatus, for example at a height of about 50 to 100 mm, preferably of 80 mm, above said resting plane.

Each bar B1 and B2 is provided with a plurality of photodiodes, arranged side by side with a first preset pitch, as far as the overall dimension of the bar. According to an important feature, the photodiodes are arranged on the respective bars so that a plurality of stationary electromagnetic beams is emitted, oriented towards different angles with respect to the bar axis, so as to form a plurality of stationary horizontal beam patterns of a certain width around a line perpendicular to the bar.

The patterns of electromagnetic beams coming out of the bar mutually intersect depending on the distance between the photodiodes and on the pattern width. Preferably, electromagnetic beams are emitted according to a triangular fan-like pattern, being on a horizontal plan.

That determines a crossing of electromagnetic beams (see FIG. 7), with a second pitch between each other much closer than the first pitch between the individual photodiodes on the bar, which allows to significantly increase the spatial resolution of the beam pattern in the central area of the flat barrier formed by the electromagnetic beams.

According to a preferred embodiment, the individual receiving-transmitting photodiodes are arranged on bars B1 and B2 with a mutual distance (first pitch) of between 2 and 8 mm, preferably of 4 mm, and are apt to generate patterns of electromagnetic beams which intersect on the horizontal plane at a certain distance from the bar, for example at no less than 100 mm from the bar.

Figure 7:
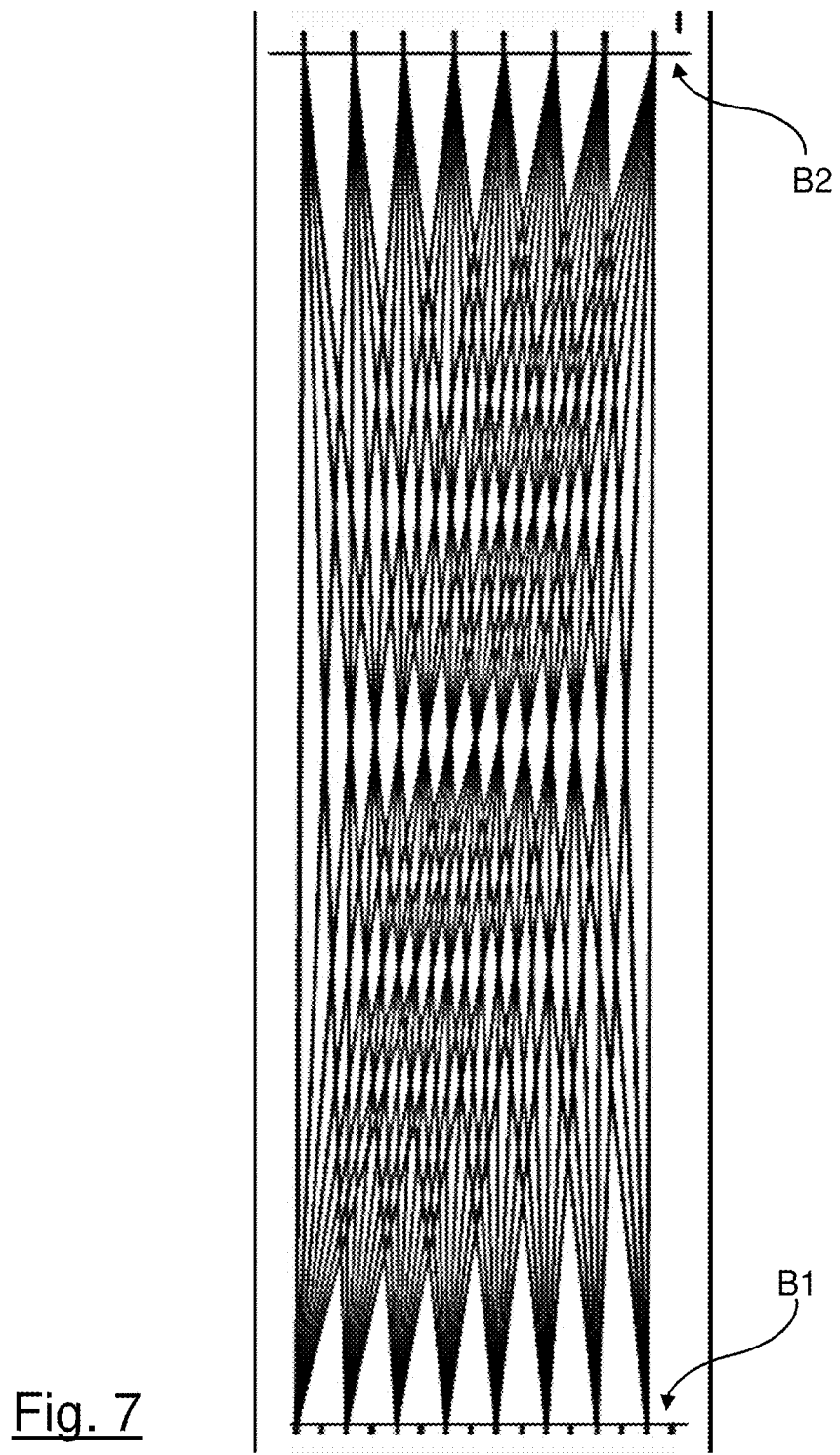
FIG. 7 is a plan view of a detection beam pattern according to the invention.

Preferably, as illustrated in FIG. 7, the beams are crossing each other and oriented asymmetrically to achieve a thickening of the beam crossings in the central area of the beam barrier plane.

Exemplifying photodiodes emit electromagnetic light beams not necessarily in the visible spectrum, for example in the infrared portion of the electromagnetic spectrum. Photodiodes for example can have a wavelength of 860 nm and maximum reaction time for H 1600=9 msec and for H 2160=11 msec.

Photodiodes are electrically powered and are preferably provided with a potentiometer on the incoming current, so as to be able to adjust the distance rate depending on the distance at which the two bars B1 and B2 are arranged in the specific handling apparatus.

Since in the part closest to the bars the beam patterns do not cross, a low-coverage area closer to the bars is determined—for example in the first 300-500 mm near the ends—that is where the light beam resolution is reduced; for such reason, the bars of photodiodes B1 and B2 are preferably located outside the actual work area of the handling apparatus, at a greater distance that the low-coverage one, for example greater than about 500 mm.

Also, the width of the bars of photodiodes B1 and B2 is preferably greater by about 50-100 mm than the width of the metal sheets to be processed, so as to have a sure and full coverage of the work area.

In the drawings the two bars of photodiodes B1 and B2 are shown opposite to each other along the longitudinal axis of the sheet change support 1; hence the two bars are arranged on the shorter sides of the metal sheets. However, it is not ruled out that it would be preferable, in some specific installations, to orient them at 90° with respect to what has been shown in the drawings, or to prepare two mutually perpendicular pairs of photodiode bars. Such option would allow to cover metal sheet dimensions greater than 5/6 meters even when the photodiode distance rate did not exceed 6 meters, as in some applications currently easily feasible with devices available on the market.

The emitter and receiver location, as well as the size of the photodiodes, in addition to the definition of the pitch between the same, is chosen so as to define a mesh of intersecting beams which adjusts to the specific work conditions or to the specific application. In any case, the individual electromagnetic radiation beams of the photodiodes generate fanlike mesh from the emitters on one side of either one of the two barriers B1 or B2 and impinge individually to the opposite receivers on the other one of the two barriers B2 or B1.

When a foreign element—for example a metal sheet flap dangling downwards—intercepts a radiation beam, the radiation of that beam does not get to the target receiver: the absence of impinging emission to the receiver generates a signal which is perceived as an abnormal operating condition, determining the start of a sequence of correcting actions.

This specific arrangement with photodiode opposite bars emitting intersecting beam patterns, produces a mesh-like barrier of light beams similar to the one shown in FIG. 7, with an optimal detection resolution for the specific application to the metal sheet handler. In particular, employing a reduced number of photodiodes a light beam mesh resolution is obtained such as to intercept a metal sheet or a portion of metal sheet with thickness 0.5 mm and a width of 10-15 mm.

In order to overcome even the most challenging conditions, wherein a thin strip of metal sheet may not intercept any beam in a certain position, an assessment over time of the signals detected by the photodiode bars is employed.

In particular, the detected signal is evaluated during the lifting movement of handlers 3, for example the acquisition of the signal from bars B1 and B2 is performed in the lifting step of gripping heads 3 from movement start until a preset subsequent moment, for example for 5 subsequent seconds, or from height 0 to height 150 mm.

The acquisition of the detected signal may be performed in different ways. A first way, provides time scanning of signal, that is from a first preset height (typically from 100-120 mm with respect to the location where the metal sheet is drawn on the resting mesh of table change 1) the reading of the barrier signal begins, which may end after a time T (typically from 1 to 5 seconds); a second way provides instead that the reading of the barrier signal begins from such first preset height and continues as far as a height H, for example by 150 mm above the first preset height.

Thereby, even if there are some locations where anomalous sheet portions are not intercepted by the beams, during the lifting movement the chances of not detecting parts depending from the horizontal plane of the metal sheet are sharply reduced.

The signal coming from the barrier may be detected analogically or it may be sampled to then be digitally processed.

If in this time or movement interval the horizontal barrier of light beams is not interrupted, no signal is detected by the control system and the handling apparatus continues its work cycle.

Should the light beam barrier instead be interrupted by the scrape material dangling underneath the shaped piece or by the very same pieces, the control system would detect at least a signal from the barrier—for example an analogical value above a certain threshold—and the control logic would determine a warning condition, which could trigger for example a movement halt of gripping heads 3 and go back to the starting position. In this case the gripping and lifting operation is repeated preferably three times, to be certain that no false interruption signals have arisen and to verify if the repeated movement solves the problem (for example because the repeated loading breaks the joining points between the scrap and the cut piece). After the third consecutive attempt in which the apparatus detects intercepting of the light beams, the method of the invention alternatively provides to:

A. Continue the work cycle, skipping the picking-up of that specific cut piece which caused the jamming signal, picking-up the following shaped piece, or B. Block the operation, signaling the event and asking for operator assistance.

According to a preferred embodiment of the invention, in order to reduce any reflexes generated by a particularly shiny surface (such as for example in the case of zinc-coated or stainless steel sheets), which would determine errors in the light detection of the receivers of the photodiode bars (false negative), a shielding profile is provided, mounted parallel to the barriers in the proximity of the resting plane of the metal sheets, at a lower height (by a few millimeters) than the plane of the horizontal barrier of the light beams.

As can be understood from the above-reported description, the apparatus and the method offered by the invention perfectly achieve the objects set forth in the premises.

As a matter of fact, it is provided a metal sheet handling apparatus equipped with a sufficiently simple and inexpensive light beam barrier (since it uses electromagnetic elements easily found on the market), but arranged so as to obtain high resolution and reliability, even in case it is necessary to process very thin metal sheets (such as stainless steel sheets for the food machine sector).

However, it is understood that the invention must not be considered limited to the particular embodiment illustrated above, which makes up only one exemplifying embodiment thereof, but that different variants are possible, all within the reach of a person skilled in the field, without departing from the scope of protection of the invention itself, as defined by the following claims.

For example, in the specification it has been made reference to a metal sheet, but the invention can also be applied to any kind of sheet/plate/foil, even not metallic, being not transparent to electromagnetic beam.

The invention claimed is:

1. A handling sheet apparatus comprising:
   a gripper configured to grip and transfer sheets to and from a sheet change support with a substantially horizontal attitude; and
   an electromagnetic beam receiver and transmitter configured to generate electromagnetic beams arranged on a plane which is intercepted by said sheets when the sheets take up an attitude at least partially different from the substantially horizontal attitude, said electromagnetic beam receiver and transmitter being fixedly disposed on at least a pair of linear bars disposed at the same height and provided with a plurality of photodiodes disposed side-by-side with a first preset pitch, the pair of linear bars with the photodiodes being configured to generate a horizontal-mesh electromagnetic beam barrier comprising intersecting, stationary electromagnetic beams oriented toward different angles with respect to a bar axis to form a plurality of stationary horizontal beam patterns of a specific width around a line perpendicular to the pair of bars, wherein said horizontal-mesh electromagnetic beam barrier is defined above an area occupied by said sheet change support, and said horizontal-mesh electromagnetic beam barrier comprises electromagnetic beams mutually arranged in a triangular fan pattern, determining a crossing of said stationary electromagnetic beams with a second preset pitch between each other that is closer than said first preset pitch, thereby increasing a spatial resolution of the beam pattern in a central area of said horizontal-mesh electromagnetic beam barrier with respect to a spatial resolution of the beam pattern outside of the central area.

2. The apparatus of claim 1, wherein said horizontal-mesh electromagnetic-beam barrier is determined by the at least one pair of bars of receiving transmitting photodiodes, arranged opposite one another on two opposite sides of said sheet change support and of a greater width than a width of said sheets.

3. The apparatus of claim 2, wherein said photodiode bars are disposed at a height above a resting plane of said sheets on said sheet change support.

4. The apparatus of claim 3, wherein said photodiodes have a mutual pitch of about 2 to 8 mm.

5. An operating method of the handling apparatus of claim 3, the method comprising:
defining the horizontal-mesh electromagnetic beam barrier with the stationary electromagnetic beams which intersect each other by the at least one pair of bars provided with the photodiodes, arranged mutually opposite on two opposite sides of the sheet change support for the sheet;
detecting a signal of the photodiodes to identify any intercepting of said stationary electromagnetic beams upon said sheets being removed from said sheet change support, said detecting being performed during a lifting of said sheet or of a part thereof from a first preset height equal to or greater than the height of said sheet change support to a second preset height greater than said first preset height, upon a lifting of gripping heads of the handling apparatus from a movement start until a preset subsequent movement.

6. The apparatus of claim 2, wherein said photodiodes have a mutual pitch of about 2 to 8 mm.

7. An operating method of the handling apparatus of claim 6, the method comprising:
defining the horizontal-mesh electromagnetic beam barrier with the stationary electromagnetic beams which intersect each other by the at least one pair of bars provided with the photodiodes, arranged mutually opposite on two opposite sides of the sheet change support for the sheet; and
detecting a signal of the photodiodes to identify any intercepting of said stationary electromagnetic beams upon said sheets being removed from said sheet change support, said detecting being performed during a lifting of said sheet or of a part thereof from a first preset height equal to or greater than the height of said sheet change support to a second preset height greater than said first preset height, upon a lifting of gripping heads of the handling apparatus from a movement start until a preset subsequent movement.

8. The apparatus of claim 2, wherein said photodiode bars are disposed a height of about 80 mm above a resting plane of said sheets on said sheet change support.

9. The apparatus of claim 2, wherein said photodiodes have a mutual pitch of 4 mm.

10. An operating method of the handling apparatus of claim 2, the method comprising:
defining the horizontal-mesh electromagnetic beam barrier with the stationary electromagnetic beams which intersect each other by the at least one pair of bars provided with the photodiodes, arranged mutually opposite on two opposite sides of the sheet change support for the sheet; and
detecting a signal of the photodiodes to identify any intercepting of said stationary electromagnetic beams upon said sheets being removed from said sheet change support, said detecting being performed during a lifting of said sheet or of a part thereof from a first preset height equal to or greater than the height of said sheet change support to a second preset height greater than said first preset height, upon a lifting of gripping heads of the handling apparatus from a movement start until a preset subsequent movement.

11. An operating method of the handling apparatus of claim 1, the method comprising:
defining the horizontal-mesh electromagnetic beam barrier with the stationary electromagnetic beams which intersect each other by the at least one pair of bars provided with the photodiodes, arranged mutually opposite on two opposite sides of the sheet change support for the sheet; and
detecting a signal of the photodiodes to identify any intercepting of said stationary electromagnetic beams upon said sheets being removed from said sheet change support, said detecting being performed during a lifting of said sheet or of a part thereof from a first preset height equal to or greater than the height of said sheet change support to a second preset height greater than said first preset height, upon a lifting of gripping heads of the handling apparatus from a movement start until a preset subsequent movement.

12. The operating method of claim 11, wherein, when any intercepting of said electromagnetic beams is detected, said sheet or part thereof is lowered again onto said sheet change support and the detecting and the lifting are repeated at least twice before halting the operation and emitting a warning signal.

13. The operating method of claim 12, wherein the difference between said first preset height and said second preset height is about 150 mm.

14. The operating method of claim 12, wherein the difference between said first preset height and said second preset height is greater than 80 mm.

15. The operating method of claim 11, wherein the difference between said first preset height and said second preset height is greater than 80 mm.

16. The operating method of claim 11, wherein the difference between said first preset height and said preset second height is about 150 mm.

* * * * *